US005390289A

United States Patent [19]

Beitel et al.

[11] Patent Number: 5,390,289

[45] Date of Patent: Feb. 14, 1995

[54] ANTI-ALIAS FONT GENERATION

[75] Inventors: Bradley J. Beitel, Woodside; Robert D. Gordon, Sunnyvale, both of Calif.; Joseph B. Witherspoon, III, Austin, Tex.

[73] Assignee: International Business Machines Corporation, Armonk, N.Y.

[21] Appl. No.: 169,750

[22] Filed: Dec. 17, 1993

Related U.S. Application Data

[63] Continuation of Ser. No. 367,063, Jun. 16, 1989, abandoned.

[51] Int. Cl.$^{6}$ .............................................. G06F 15/62

[52] U.S. Cl. ...................................... 395/100; 395/138

[58] Field of Search ............... 395/142, 143, 155, 161, 395/100, 152, 138; 382/44, 45, 56; 345/202

[56] References Cited

U.S. PATENT DOCUMENTS

| | | | |
|---|---|---|---|
| 4,361,853 | 11/1982 | Remy et al. | 358/167 |
| 4,546,385 | 10/1985 | Anastassiuo | 358/133 |
| 4,578,812 | 3/1986 | Yui | 382/41 |
| 4,605,952 | 8/1986 | Powers | 358/13 |
| 4,653,013 | 3/1987 | Collins et al. | 364/518 |
| 4,672,369 | 6/1987 | Preiss et al. | 340/728 |
| 4,679,040 | 7/1987 | Yan | 340/747 |
| 4,704,605 | 11/1987 | Edelson | 340/728 |
| 4,794,448 | 12/1988 | Takizawa | 358/44 |
| 4,808,984 | 2/1989 | Trueblood et al. | 340/723 |
| 4,816,898 | 3/1989 | Farley et al. | 358/11 |
| 5,025,405 | 6/1991 | Swanson | 364/723 |

FOREIGN PATENT DOCUMENTS 0105116 11/1984 European Pat. Off. .

OTHER PUBLICATIONS

IBM Technical Disclosure Bulletin vol. 31, No. 3, Aug. 1988, pp. 437–450, Armonk, N.Y., U.S. "Fast Alogorithm for Shearing a Binary Image" p.437, 1st paragraph—p. 439, 2nd paragraph, FIG. 1.

*Primary Examiner*—Heather R. Herndon
*Assistant Examiner*—N. Kenneth Burraston
*Attorney, Agent, or Firm*—Perman & Green

[57] ABSTRACT

A method of generating a second, substantially anti-aliased, representation of a character from a first representation. The second representation is comprised of horizontal lines of dots that are shifted horizontally relative to dots of the first representation, each dot of the first representation having a value DOT1 associated therewith. The method include a step of, for each horizontal line (1−m) within the first representation of a character and for each dot (1−j) within a horizontal line, (a) determining a modifying value (DOT1k) associated with a dot(k) of the first representation, DOT1k being a function of DOT1 of the dot(k). The method includes another step of determining a value (DOT2k) of a corresponding dot for the second representation, the value of the corresponding dot being determined in accordance with the expression DOT2k=((DOT1−DOT1k )+DOT1(k−1)), where DOT1(k−1) is a modifying value of an adjacent dot on the horizontal line. The modifying value is preferably determined by a table lookup procedure within a table of previously generated values.

14 Claims, 2 Drawing Sheets

COLUMN (PEL VALUE)
| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| ROW 0 | 0 | 0 | 0 | 0 | 0 | 0 | 0 | 0 | 0 | 0 | 0 | 0 | 0 | 0 | 0 | 0 |
| 1 | 0 | 0 | 1 | 1 | 1 | 1 | 2 | 2 | 2 | 2 | 3 | 3 | 3 | 3 | 4 | 4 |
| 2 | 0 | 1 | 1 | 2 | 2 | 3 | 3 | 4 | 4 | 5 | 5 | 6 | 6 | 7 | 7 | 8 |
| 3 | 0 | 1 | 2 | 2 | 3 | 4 | 5 | 5 | 6 | 7 | 8 | 8 | 9 | A | B | B |
FIG. 3
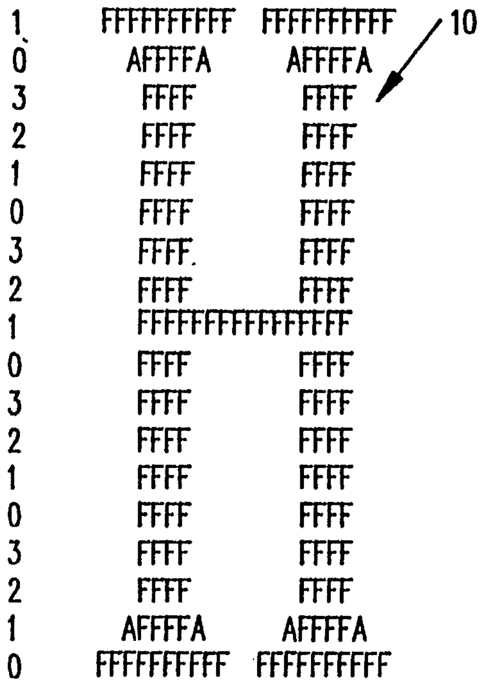
FIG. 1
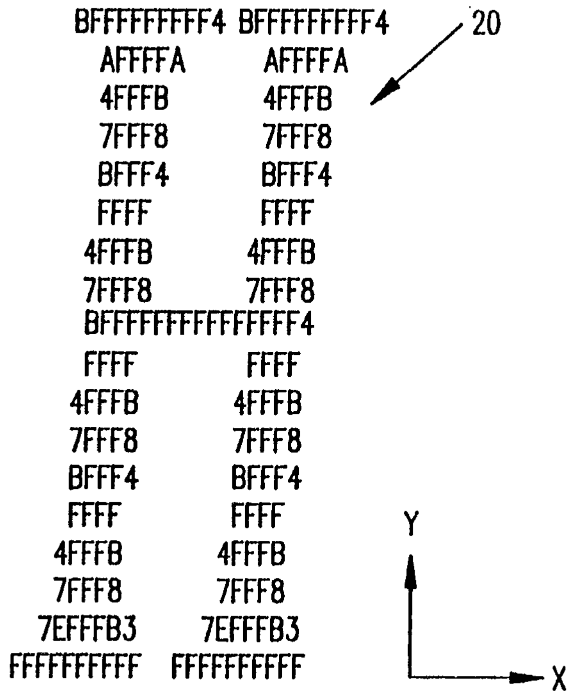
FIG. 2

ANTI-ALIAS FONT GENERATION

This is a continuation of application(s) Ser. No. 07/367,063, filed on Jun. 16, 1989, now abandoned.

FIELD OF THE INVENTION

This invention relates generally to the generation of displayable character fonts and, in particular, relates to the generation of an anti-aliased font that is shifted along a horizontal axis from a source font.

BACKGROUND OF THE INVENTION

A problem associated with the generation on a display screen of images having edges aligned other than vertically and/or horizontally is the effect of aliasing. That is, a diagonal edge will appear to exhibit a number of discrete jumps or "stairsteps" instead of a straight line. An aliased image is generally considered to be unsatisfactory. The size and number of the jumps is a function of the resolution of the display, that is, on the number of pels per unit area. As the resolution of the display increases the effect of aliasing is made less noticeable. However, high resolution displays are generally costly and their use may not be justifiable for a number of character display applications.

The generation of an anti-aliased horizontally shifted font, such as an italic font, from a source font can be a computationally expensive task. However, the generation of the italic font reduces the overall font storage requirements and may thus be desirable.

It is therefore an object of the invention to provide a method of generating an anti-aliased second font from a first, or source, font.

It is another object of the invention to provide a method of generating an anti-aliased italic font from a standard uncompressed source font.

SUMMARY OF THE INVENTION

The foregoing problems are overcome and the objects of the invention are realized by a method of generating a second representation of a bit mapped image object, such as a character, from a first representation. Each dot of the second representation is shifted b a fractional amount (a/b) of a dot width from a corresponding dot of the first representation. A carry-value table is generated and has a number of rows (R) equal to (b) and a number of columns (C) equal to possible values (DOT1) of a pel. The value of the individual table entries (R,C), that is pel modifying values DOT1(k), are found in accordance with the expression:

$$DOT1(k)=((DOT1/b)*a),$$

where * denotes multiplication, / denotes division and wherein (a) has a value of zero for the first row, one for the second row and a value of (b−1) for the last row.

Next, for each horizontal line (1−m) within the first, or source, character and for each dot (1−j) within a horizontal line there is determined from the carry-value table the modifying value (DOT1k) of a dot (k). The dots of the input horizontal line are processed from left to right for a right-leaning slant. The value of the source character dot (DOT1) and the row number is used to reference the table to retrieve the value of DOT1k. DOT1k is saved as a "next carry value". For the first dot (dot(1)) of a row a "last carry value" term (DOT1(k−1) is set to zero. A value (DOT2k) of a corresponding dot for the second character is determined in accordance with the expression:

$$DOT2k=((DOT1-DOT1k)+DOT1(k-1)).$$

After determining DOT2k for input character dots 1−j the method determines a value for an additional output dot (DOT2(j+1)) as being equal to DOT1(k−1).

BRIEF DESCRIPTION OF THE DRAWING

The above set forth and other features of the invention are made more apparent in the ensuing Detailed Description of the Invention when read in conjunction with the attached Drawing, wherein:

FIG. 1 illustrates a first character represented in a source font;

FIG. 2 illustrates a second character generated from the first character by the method of the invention; and FIG. 3 shows the contents of a lookup table employed by the method of the invention.

DETAILED DESCRIPTION OF A PREFERRED EMBODIMENT OF THE INVENTION

Figure 4:
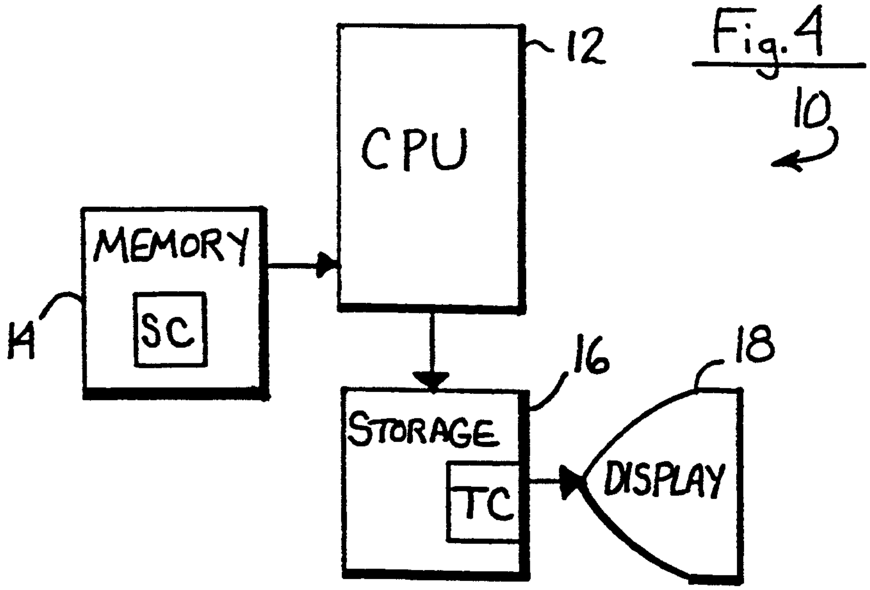
FIG. 4 is a block diagram illustrating a data processing system that employs the method of the invention.

FIG. 1 illustrates an uncompressed first, or source character 10, in this case an "H" comprised of a number of displayable dots or pels each of which has a four bit intensity value between 0 and $F_{16}$. The character 10 may be displayed on a visual display such as a well known raster scan CRT. The individual pel values are stored within a memory of a data processing system and are accessible to a CPU. It is understood that the background pel values, not shown, may be all set to zero or to some value that provides a desired degree of contrast with the value of the pels of the character 10. In some embodiments each pel may have a range of values that is less than or greater than zero to $F_{16}$. Although the ensuing description is made in the context of alphanumeric characters it should be realized that the teaching of the invention is applicable in general to a large number of different types of image objects.

FIG. 2 illustrates a second, target character 20 that is generated from the source character 10 by the method of the invention. Character 20 has a plurality of dots or pels that are shifted along a horizontal x-axis by some fractional portion of a pel, in this case ¼ of a pel. Other shifts of, for example, ⅜ or 7/14 of a pel are also possible. The shift is applied on a row by row basis such that an overall vertical slant is imparted to the character 20. As illustrated the target character 20 is the italic form of the source character 10.

It can be noticed that certain of the edge-related pels of the target character 20 have been assigned different intensity values. The overall effect of this assignment of intensity values is to cause the diagonally disposed edges of the displayed character to be visually smoothed and straightened. That is, the character 20 is anti-aliased.

Referring to the block diagram of FIG. 4 there is illustrated a system 10 that employs the method of the invention. System 10 includes a CPU 12 coupled to a memory 14 that stores the representation of the source character (SC). The CPU 12 is also coupled to a storage device 16, such as a character generator device, for storing the representation of the target character (TC) therein. The storage device 16 is coupled to a display 18 for providing the representation of the target character thereto.

An initial step of the method creates a carry-value table of the type shown in FIG. 3. The table has a number of rows (n) equal to the denominator of the pel shift, for example, four rows for a pel shift of $\frac{1}{4}$ or eight rows for a pel shift of $\frac{3}{8}$. The pel carry values associated with the first row are made all zeroes. The pel carry values associated with the next row are set equal to 1/n of the pel value. For example, for the pel value of 8 the carry value is 8($\frac{1}{4}$) or 2. Non-integer results are rounded up or down as necessary to an integer value. The pel carry values associated with the next row are set equal to 2/n of the associated pel value, those of the next row to 3/n of the associated pel value, etc.

That is, each dot of the second character representation is shifted by a fractional amount (a/b) of a dot width from a corresponding dot of the first representation. The carry-value table has a number of rows (R) equal to (b) and a number of columns (C) equal to possible values (DOT1) of a pel. The value of the individual table entries (R, C), that is the modifying values DOT1(k), are found in accordance with the expression:

$$DOT1(k)=((DOT1/b)*a), \tag{1}$$

where * denotes multiplication, / denotes division and wherein (a) has a value of zero for the first row, one for the second row and a value of (b−1) for the last row.

A next step of the method employs the carry-value table so generated to parse the input character 10 to generate the output character 20. At the start of a particular row of display pels, or scan line, the appropriate row of the carry-value table is selected. It can be seen that for a pel shift having a denominator of four that the four rows of the table are repetitively applied in a bottom to top fashion over the input character 10 in the manner shown. It should be noted that the method may also be practiced by parsing the input character from top to bottom.

In accordance with a method of the invention for each horizontal line (1−m) within the source character 10 and for each dot (1−j) within a horizontal line there is determined from the carry-value table the modifying value (DOT1k) of a dot (k). The dots of the input horizontal line are processed from left to right for a right-leaning slant. The value of the source character dot (DOT1) and the row number is used to reference the table to retrieve the value of DOT1k. DOT1k is saved as a "next carry value". For the first dot (dot(1)) of a row a "last carry value" term (DOT1(k−1) is set to zero. A value (DOT2k) of a corresponding dot for the second character 20 is determined accordance with the expression:

$$DOT2k=((DOT1-DOT1k)+DOT1(k-1)). \tag{2}$$

After determining DOT2k for input character dots 1−j the method determines a value for an additional output dot (DOT2(j+1)) as being equal to DOT1(k−1).

As an example, and referring to the Figures, the first dot (dot1(1)) of lowermost row 1 of input character 10 has a value of $A_{16}$. In that this is the first dot of the line DOT1(k−1) is set to zero. The entry of the table corresponding to row 1 and a character value of $A_{16}$ results in DOT1k being assigned a value of 3. Solving for dot2(1) results in $DOT2=((A_{16}-3)+0)=7$. Next, dot1(2) has a value of $F_{16}$ which results in DOT1k being assigned a value of 4 from the table. DOT1(k−1) was assigned a value of 3 after the processing of the first dot of the scan line. Solving for dot2(2) results in $DOT2=((F_{16}-4)+3)=E_{16}$. After processing all of the input dots of row 1 a value of DOT2(j+1) is made equal to DOT1(k−1), or 3 in this case. In that the method normally adds a pel at the end of every scan line, for italic characters a value of one is added to a calculated character width to prevent adjacent characters from overlapping.

The generated character set resulting from the application of the method of the invention may be stored in a character generator device for supplying variable intensity pels to a display screen in a known manner.

A routine written in the C programing language that implements the method of the invention is set forth below.

```
#include<stdio.h> #include <malloc.h>
/***italicize a char ******************
        PROCEDURE: italic
      PARAMETERS: inc_amt, wid_in, hgt_in, mat_in,
          wid_out, hgt_out, mat_out
        RETURNS: integer error code, 0=no error
    PRECONDITIONS: matrix must contain uncompressed
          character data
POSTCONDITIONS: mid_out & hgt_out contain values for
          output matrix mat_out contains italic
          character
      FUNCTION: turns a character into an italic character
based on the inc_amt passed. allocates storage for the
output matrix
*******************************************************/
#define range (a,b,c) (((b) < (a)) ? (a) : (((b) > (c)) ?
               (c) : (b)))
italic(inc_amt, wid_in, hgt,_in, mat_in, wid_out,
mat_out, lvl_in) int inc_amt; /*increment amount in
1/8's of a pel */int wid_in; /*width of orig character
matrix */int hgt_in; /*height of orig character matrix
*/char*mat_in; /*ptr to orig character matrix */int
*wid_out; /*ptr to width of new character matrix
*/char**matout; /*ptr to ptr of new character matrix
*/char lvl_in; /*maximum intensity level of input */{
static int ratio[8] [4] = { 0,0,8,0, /* 0 */
                         0, 1, 8, -1, /* + 1/8 */
                         0, 2, 7, -1, /* + 2/8 */
                        -1, 4, 6, -1, /* + 3/8 */
                        -2, 6, 6, -2, /* + 4/8 */
                        -1, 6, 4, -1, /* + 5/8 */
                        -1, 7, 2,  0, /* + 6/4 */
                        -1, 8, 1,  0}; /* + 7/8 */
int i,j,k, wholepels,partpels,oldpel,newpel,wid_index,
inc; unsigned char *pclptr;
/*determine width of new matrix and alloc, use calloc for
0 init */*wid_out = wid_in + (inc_amt*(hgt_in - 1) +
7 > > 3); +mat_out = calloc(1,(unsigned) (*wid_out * hgt_in));
if (*mat_out = = NULL) return(1); pelptr = (unsigned
char *) (*mat_out + (hgt_in - 1) * *wid_out); for
(i=hgt_in-1,inc=0; i> =0;--i,inc+=inc_amt,pelptr
-=*wid_out) {
    wholepels = inc > > 3;
    partpels = inc & 7;
    for (j=0; j<*wid_out; + + j) {
      newpel = 0
      for (k=0; k<4; + + k) {
        wid_index = j + k - 2 - wholepels; /*calc horiz
        index into old mat */
        if((wid_index < 0)   (wid_index > = wid_in))
        oldpel = 0; /*chk bounds */
        else oldpel = *((unsigned char*) (mat_in + i *
        wid_in + wid_index));
        newpel + = ratio[partpels][k] * oldpel;   /* add
        in pel * ratio */
        }
      newpel = newpel + 4 > > 3;
      pelptr[j] = range(0,newpel,lvl_in);   /*round &
      divide by 8*/
      }
```

-continued

```
} return(0);} /*italic*/
```

While the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. In a system including data processing means and a program executed by the data processing means, a method employing the program for generating a second, substantially anti-aliased, representation of a displayable image object from a first representation of the image object, the first representation and the second representation each being comprised of a plurality of intensity values individual ones of which represent an intensity value of a corresponding one of a plurality of display means pels, wherein a single display means pel occupies a finite area upon a display screen and has an associated width, and wherein each of the display means pels is displayable with an intensity within a range of intensities that varies between a minimum intensity and a maximum intensity and including a plurality of intermediate intensities, the plurality of intensity values being organized as rows and columns of intensity values corresponding to rows and columns of display means pels, the method comprising the steps of:

determining an amount of a desired user perceivable horizontal shift for at least one row of pels of the second representation, the amount of the desired user perceivable horizontal shift corresponding to a fraction (a/b) of the width, when displayed on the display screen, of a display means pel;

for each row within the first representation of the image object and for each intensity value (DOT1) within the row, determining with the data processing means an intensity modifying value (DOT1k), wherein DOT1k is a function of the intensity value (DOT1) and also a function of the determined amount of the desired user perceivable horizontal shift;

determining with the data processing means an intensity value (DOT2k) of a corresponding displayable pel for the second representation, the intensity value (DOT2k) of the corresponding displayable pel of the second representation being determined in accordance with the expression:

$$DOT2k = ((DOT1 - DOT1k) + DOT1\ (k-1)),$$

where DOT1(k−1) is the intensity modifying value of an adjacent intensity value of the row;

storing each of the determined intensity values (DOT2k) of the second representation within a character generator memory device for subsequent use in displaying an anti-aliased image object that is visually perceived as being horizontally shifted, on a row-by-row basis relative to the first representation, by the fraction of the width of a display means pel; and accessing the character generator memory device to retrieve the stored DOT2k intensity values and outputting the retrieved DOT2k intensity values to a display means for display on a display screen thereof as a plurality of display screen pels each of which has an intensity within the range of intensities that varies between the minimum intensity and the maximum intensity and including the plurality of intermediate intensities.

2. A method as set forth in claim 1 wherein the step of determining the intensity modifying value includes a step of using the data processing means to look up the value of DOT1k within a table of intensity modifying values.

3. A method as set forth in claim 2 wherein the table has a number of columns equal to a number of possible intensity values that DOT1 may assume, and a number of rows that is a function of the determined amount of the desired user perceivable horizontal shift.

4. A method as set forth in claim 2 wherein the method includes an initial step of generating, with the data processing means, individual entries of the table, the table having a number of rows equal to (b) and a number of columns equal to a number of possible intensity values that DOT1 may assume, the step of generating the individual entries of the table including a step of, for each row and column of the table, determining the value of DOT1(k) in accordance with the expression $$DOT1(k) = ((DOT1/b)^* a),$$

where, denotes multiplication, / denotes division and wherein (a) has a value of zero for the first row of the table and a value of (b−1) for the last row of the table.

5. A method as set forth in claim 4 wherein the step of determining an intensity modifying value is accomplished by accessing a row of the table with the data processing means, the particular row that is accessed being a function of the row number of the first representation of the displayable image object for which the intensity modifying value is being determined, and accessing a column of the table with the data processing means, the particular column that is accessed being a function of the value of DOT1.

6. A method as set forth in claim 1 wherein after executing the step of determining an intensity value DOT2k for all of the intensity values within a row the method includes a further step of determining an intensity value (DOT2(k+1)) for an additional displayable pel as being equal to the intensity modifying value (DOT1k) that was determined for the last intensity value of the row.

7. A method as set forth in claim 6 and including a step of adding, with the data processing means, a value of one pel to a width of the second representation of the displayable image object to prevent an overlap between two horizontally adjacent displayed second representations.

8. A method as set forth in claim 1 wherein for a first intensity value of a row the value of DOT1 (k−1) is set equal to zero when executing the step of determining the intensity value.

9. In a system including data processing means and a program executed by the data processing means, a method employing the program for generating a substantially anti-aliased italics representation of a displayable character from a first representation of the character, the italics representation and the first representation each being comprised of a plurality of intensity values individual ones of which represent an intensity value of a corresponding one of a plurality of display means pels, wherein each of the display means pels is displayable with an intensity within a range of intensities that varies between a minimum intensity and a maximum intensity and including a plurality of intermediate intensities, and wherein a single display means pel occupies a finite area upon a display screen and has an associated width, the plurality of intensity values being organized as rows and columns of intensity values corresponding to rows and columns of display means pels, wherein at least one row of intensity values of the italics representation is representative of pels that are shifted horizontally relative to pels of a corresponding row of the first representation, the method comprising the steps of:

determining an amount of a desired user perceivable horizontal shift for the at least one row of pels of the italics representation, the amount of the desired user perceivable horizontal shift corresponding to a fraction (a/b) of the width, when displayed on the display screen, of a display means pel;

generating, with the data processing means, individual entries of a table, the table having a number of rows equal to (b) and a number of columns equal to a number of possible intensity values that an intensity value DOT1 of the first representation of the character may assume, the step of generating the individual entries of the table including a step of, for each row and column of the table, finding a value of an intensity value modifying factor DOT1(k) in accordance with the expression $$DOT1(k)=((DOT1/b)*a),$$

where * denotes multiplication, / denotes division and wherein (a) has a value of zero for a first row of the table and a value of (−1) for a last row of the table; and for each row within the first representation of a character and for each intensity value DOT1 within the row of the first representation, obtaining from the generated table one of the modifying factors (DOT1k);

determining, with the data processing means, an intensity value (DOT2k) of a corresponding pel for the italics representation of the character, the intensity value (DOT2k) of the corresponding pel being determined in accordance with the expression:

$$DOT2k=((DOT1-DOT1k)+DOT1(k-1)),$$

where DOT1(k−1) is the intensity value modifying factor that was previously obtained for an adjacent intensity value DOT1 of the row;

storing the determined intensity values (DOT2k) of the italics representation of the character within a character generator memory device for subsequent use in displaying an anti-aliased italics representation of the character; and accessing the character generator memory device to retrieve the stored DOT2k intensity values and outputting the retrieved DOT2k intensity values to a display means for display on a display screen thereof as a plurality of display screen pels each of which has an intensity within the range of intensities that varies between the minimum intensity and the maximum intensity and including the plurality of intermediate intensities.

10. A method as set forth in claim 9 wherein, after executing the step of determining an intensity value DOT2k for all of the intensity values within a row, the method includes a further step of determining an intensity value (DOT2(k+1)) for an additional pel of the row as being equal to the modifying factor (DOT1k) that was obtained for the last intensity value of the row.

11. In a system including data processing means and a program executed by the data processing means, a method employing the program for transforming a stored representation of a source character into a stored representation of an italic form of the source character for display by a display means, each of the stored representations being comprised of a plurality of pel intensity values organized as rows of intensity values, the display means displaying the italic form of the source character with a plurality of pels arranged along consecutive scan lines of the display means, wherein each of the display means pels is displayable with an intensity within a range of intensities that varies between a minimum intensity and a maximum intensity and including a plurality of intermediate intensities, and wherein a single pel occupies a finite area upon a display screen and has an associated width, the method comprising the steps of:

for a desired amount of slope associated with nonhorizontal features of the italic form of the source character, determining an amount of a desired user perceivable horizontal shift along a scan line, the amount of the desired user perceivable horizontal shift corresponding to a fraction (a/b) of the width when displayed on the display screen, of a pel;

assigning pel intensity values (DOT2k) to the representation of the italic form of the source character, each of the pel intensity values (DOT2k) being assigned as a function of an intensity value (DOT1) of a corresponding pel of the representation of the source character and as a function of the determined desired user perceivable horizontal shift along the scan line, wherein, the pel intensity values (DOT2k) that are associated with pels disposed along vertical edges of the italic form of the source character are assigned so as to substantially reduce, during a display of the italic form of the source character, an aliasing effect;

storing the assigned pel intensity values (DOT2k) of the italic form of the source character within a character generator memory device for subsequent use in displaying an anti-aliased italic form of the source character; and accessing the character generator memory device to retrieve the stored DOT2k intensity values and outputting the retrieved DOT2k intensity values to a display means for display on a display screen thereof as a plurality of display screen pels each of which has an intensity within the range of intensities that varies between the minimum intensity and the maximum intensity and including the plurality of intermediate intensities.

12. A method as set forth in claim 11 wherein the step of assigning includes the steps of:

generating, with the data processing means, individual entries of a table, the table having a number of rows equal to (b) and a number of columns equal to a number of possible intensity values that an intensity value DOT1 of the source character may assume, the step of generating the individual entries of the table including a step of, for each intensity value DOT1 of the source character, finding a value of an intensity value modifying factor DOT1(k) in accordance with the expression $$DOT(k)=((DOT1/b)*a),$$

where * denotes multiplication, / denotes division and wherein (a) has a value of zero for a first row of the table and a value of (−1) for a last row of the table; and processing each row of the representation of the source character and each intensity value DOT1 within each row of the representation of the source character in accordance with the steps of, obtaining a modifying factor (DOT1k) from an entry of the table, the entry being identified by the intensity value DOT1 and by the number of the row of the source character being processed;

determining, with the data processing means, an intensity value (DOT2k) of a corresponding pel for the representation of the italics form of the source character, the intensity value (DOT2k) of the corresponding pel being determined in accordance with the expression:

$$DOT2k=((DOT1-DOT1k)+DOT1(k-1)),$$

where DOT1(k−1) is a modifying factor that was obtained for an adjacent intensity value DOT1 of the row.

13. A method as set forth in claim 12 wherein, after executing the step of determining an intensity value DOT2k for all of the corresponding pels of a row, the method includes a further step of determining an intensity value (DOT2(k+1) for an additional pel of the row as being equal to the modifying factor (DOT1k) that was obtained for the last intensity value of the row.

14. A method as set forth in claim 11 wherein DOT1 has a value within a range of zero to $F_{16}$.

* * * * *